United States Patent [19]

Ferrari

[11] Patent Number: 4,941,432
[45] Date of Patent: Jul. 17, 1990

[54] FISH PROTECTION SYSTEM

[76] Inventor: Patrick F. Ferrari, 25 Hazel Rd., Dartford, Kent, England

[21] Appl. No.: 374,950

[22] Filed: Jul. 3, 1989

[30] Foreign Application Priority Data

Jul. 18, 1988 [GB] United Kingdom ............... 8817028

[51] Int. Cl.$^5$ .............................................. A01K 63/00
[52] U.S. Cl. ........................................... 119/3; 119/5
[58] Field of Search ............. 119/3, 5; D30/106, 107, D30/102, 103

[56] References Cited

U.S. PATENT DOCUMENTS

| 3,141,442 | 7/1964 | Harris | 119/3 |
| 3,517,649 | 6/1970 | Holden | 119/5 |
| 3,699,921 | 10/1972 | Jawicek | 119/3 |

FOREIGN PATENT DOCUMENTS

| 47138 | 3/1982 | European Pat. Off. | 119/3 |
| 627802 | 10/1978 | U.S.S.R. | 119/3 |
| 705068 | 12/1979 | U.S.S.R. | 119/3 |
| 747455 | 7/1980 | U.S.S.R. | 119/3 |

Primary Examiner—John Weiss
Attorney, Agent, or Firm—James D. Hall

[57] ABSTRACT

A fish protection system comprises a plurality of guard plates and support means for supporting the guard plates on the surround of a fish pond so as to position the guard plates around the perimeter of the pond at or slightly above the water level. The support means is such that any given guard plate will tilt downwardly if subjected to a downwards force of a predetermined magnitude.

15 Claims, 6 Drawing Sheets

FISH PROTECTION SYSTEM

BACKGROUND TO THE INVENTION

This invention relates to a fish protection system, and in particular to a system for preventing predatory animals (such as cats) from attempting to attack fish from the edge of an ornamental pond. Throughout this specification, the term "pond" should be taken to include tanks or other containers for live fish.

One of the major problems of keeping fish, either by hobbyists in ornamental ponds or by fish farmers in tanks, is that cats try to catch the fish. A cat does this by 'scooping' out fish from the water margin of the pond using one of its front paws. Even if a cat fails to 'land' a fish in this way, its paw can damage a fish, which will then lie in the pond. If, as is probable, such a damaged fish dies, it will pollute the pond, thereby requiring the trouble and expense of cleaning and/or draining. As some fish can cost up to 1,000 or more, it will be apparent that this is a serious problem.

The usual way of deterring or preventing cats attacking fish in a pond is to stretch netting thereacross. Unfortunately, this is not a very effective solution. Moreover, netting is unsightly, and so detracts severely from the appearance of an ornamental pond. Netting also has to be moved for pond maintenance purposes.

Another known deterrent is to place a fence round a pond. This is not a very effective deterrent for a cat, and also detracts from the appearance of an ornamental pond.

SUMMARY OF THE INVENTION

The present invention provides a fish protection system comprising a plurality of guard plates, and support means for supporting the guard plates on the surround of a fish pond so as to position the guard plates around the perimeter of the pond at or slightly above the water level, wherein the support means is such that any given guard plate will tilt downwardly if subjected to a downwards force of a predetermined magnitude.

By ensuring that the predetermined magnitude of the downwards force is relatively small, the guard plates will not provide a firm 'ledge' for a cat's paw. Hence, because of its dislike of water, this will deter a cat from trying to catch fish by placing one front paw on a guard plate in an attempt to reach the surface of the pond with the other front paw.

Preferably, the support means is constituted by a plurality of support devices, each of which is associated with a given guard plate. Advantageously, each support device is constituted by a support member which is fixable to the surround of the pond, the support member being fixed to the associated guard plate in such a manner as to permit relative movement therebetween.

In one preferred embodiment, the support member of each support device is telescopically connected to a further support member which is fixed to the associated guard plate. Alternatively, the support member of each support device is a slidable fit within an aperture in the associated guard plate, the support member being provided with a stop for limiting the relative movement between the support member and the guard plate.

In either case, the guard plates may be designed so as to float on the surface of the water in the pond, the relative movement between the guard plates and the support members permitting the guard plates to float for a varying range of water levels in the pond. Preferably, then, the guard plates are made of a non-toxic, ultra-violet stabilised plastics material, such as polypropylene, which has a specific gravity substantially equal to 1.0. In this case, each guard plate could be moulded from green polypropylene so as to take the form of a group of lily pad leaves. This arrangement is particularly suitable for ornamental ponds. Alternatively, the guard plates could be made of transparent acrylic, in which case they would be provided with flotation means. This alternative arrangement is particularly suitable for fish farmers, who like to be able to see the entire area of a pond.

In an alternative embodiment, the guard plates are positioned above the water level. In this case, each support device is constituted by a support arm which is fixable to the surround of the pond, a tension spring connecting the support arm to the associated guard plate, and pivot connection means for pivotally supporting an edge portion of that guard plate on a side wall of the pond. Here again, each guard plate could be made of either green polypropylene or transparent acrylic, and can be patterned to depict a group of lily pad leaves.

In another preferred embodiment, the guard plates are generally fan-shaped, and each is provided with connection lugs on opposite sides of the narrow end portion thereof. The connection lugs are used to connect the guard plates pivotally together, so that a plurality of interconnected guard plates can be positioned in close proximity to the side of a pond even when that side curves. It is preferable, in this embodiment, for the guard plates to float. Accordingly, they are conveniently made of polypropylene. Alternatively, the guard plates could be made of transparent acrylic, in which case they would be provided with flotation means.

BRIEF DESCRIPTION OF THE DRAWINGS

Four forms of fish protection system, each of which is constructed in accordance with the invention, will now be described, by way of example, with reference to the accompanying drawings, in which.

DESCRIPTION OF PREFERRED EMBODIMENTS

Figure 1:
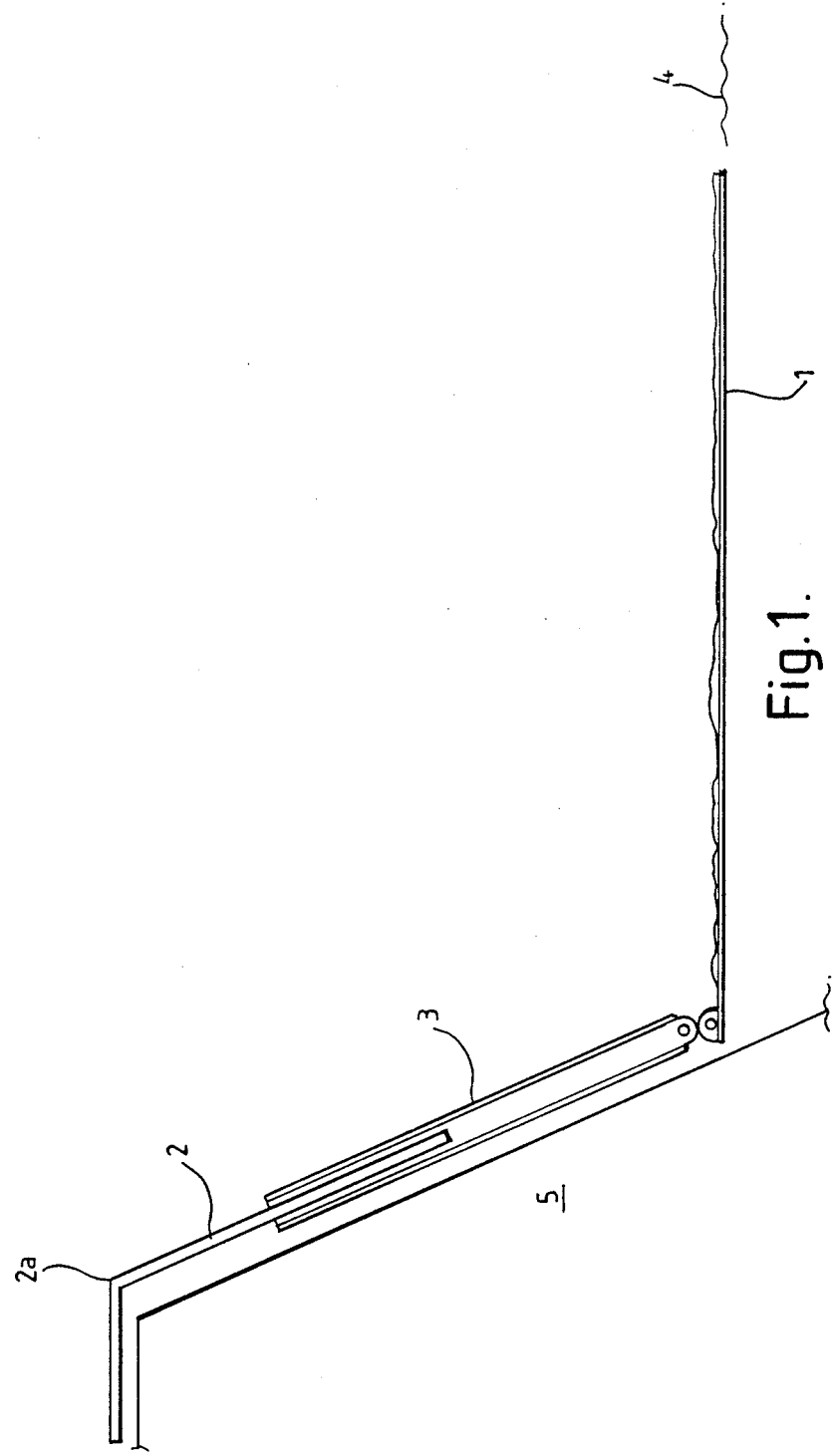
FIG. 1 is a schematic side elevation of one unit of the first form of fish protection system.
Figure 4:
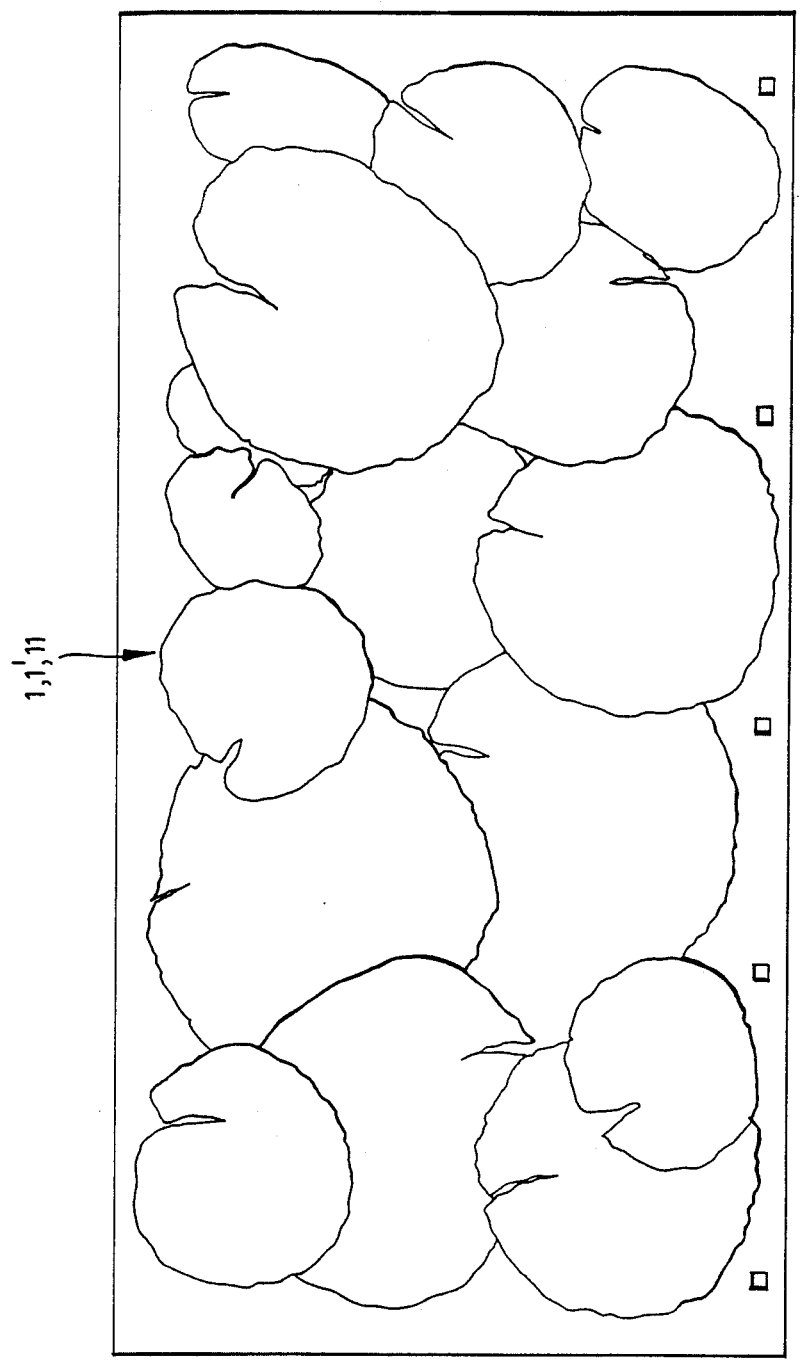
FIG. 4 is a plan view of a first form of protection plate which can be incorporated in any of the systems of FIGS. 1, 2 and 3.

Referring to the drawings, FIG. 1 shows one unit of a first form of fish protection system, the unit comprising a guard plate 1, a support arm 2, and a connector 3. The guard plate 1 is a moulded, non-toxic polypropylene sheet of a generally rectangular shape, and having dimensions of 500 mm by 240 mm. The sheet 1 is moulded to depict a group of lily pad leaves (see FIG. 4), and is coloured green so as to give a decorative appearance of lily pad leaves. For added life-like appearance, the plate 1 can be moulded to simulate veins or rays on the lily pad leaves. The polypropylene sheet has a specific gravity of about 1.0, so that the sheet will float on the surface 14 of a pond (one wall 5 of which can be seen in FIG. 1).

The support arm 2 is a stainless steel rod which is a friction (or loose) telescopic fit within one end of connector 3, which is a ⅜" diameter polypropylene tube. The other end of the connector tube 3 is pivotally attached to one edge of the guard plate 1 by means of a plastic nut-and-bolt fixing, push-fit rivets or a snap-on fitting. The support arm 2 can be fixed to the side of the pond, and can be bent, at 2a, to position the guard plate 1 closely adjacent to the wall 5 of the pond at the water level 4. Owing to the vast range of pond design, and the wall materials thereof, the rods 2 can be fixed by resin fibre glass strips, by brass screws, or by any other suitable means. The telescopic fit between the connector 3 and the rod 2 enables the guard plate 1 to adjust its floating position to any pond water level within a given range of water levels.

Figures 5, 7:
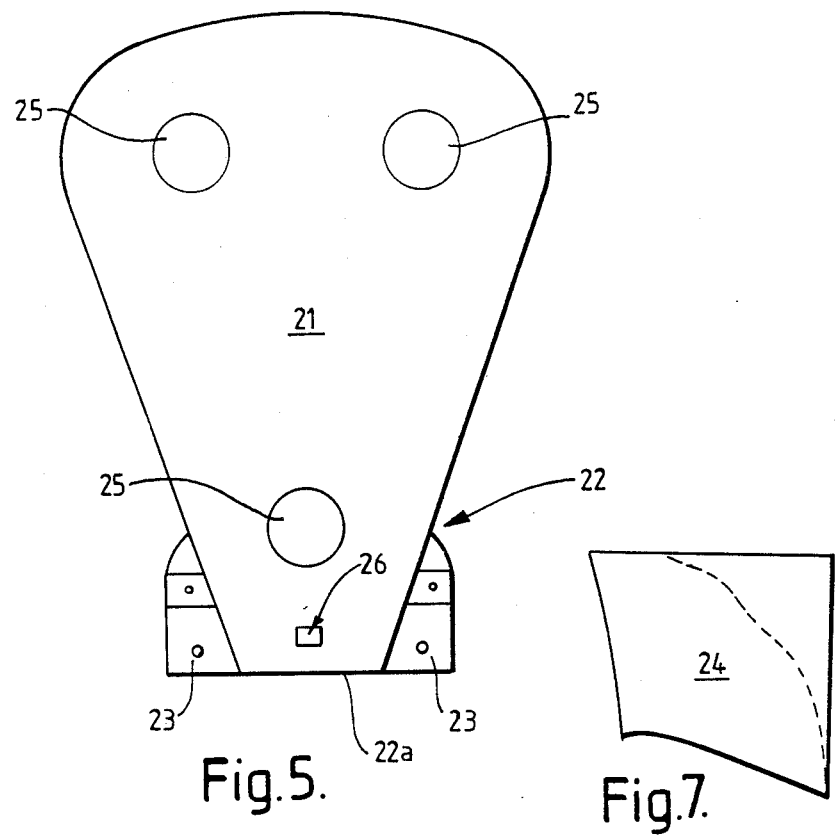
FIG. 5 is a plan view of a second form of protection plate which can be incorporated in the fourth form of fish protection system.
FIG. 7 is a plan view of an adaptor plate for use with the fourth form of system.

The first form of system is constituted by a plurality of units of the type described above. These units are placed side-by-side, with say an overlap of about 25 mm between adjacent plates, along the side walls 5 of the pond. The plates 1 can be cut with scissors to conform to curved wall portions, or where there would otherwise be an excessive overlap with an adjacent plate. This type of system is particularly suitable for rectangular ponds, as the units can be positioned to abut (or overlap) at the corners. The polypropylene sheets constituting the guard plates 1 are positioned with their longer sides parallel to the sides of the pond. The width of the plates 1 (240 mm) is chosen to be sufficiently large to prevent a cat stretching a foreleg to reach the surface of the water in the pond beyond the guard plates with its paw. Moreover, because the guard plates 1 float on the surface of the pond water, they do not constitute a firm support for a cat's paw (that is to say such a plate will sink under the surface of the water if a cat puts any weight onto it). Because of cats' dislike of water, therefore, the guard plates 1 are effective to deter cats from attempting to catch fish by scooping them out of the water with their paws (the danger area being calculated to be about 175 to 200 mm from the edge of the pond). The guard plates 1, each being moulded into the shape of a group of lily pad leaves, are also decorative, and so do not detract from the appearance of an ornamental pond.

Where a decorative appearance is not essential, the plates 1 may be made of transparent acrylic material. The modification is particularly advantageous for use by fish farmers, where it is important for the farmer to be able to see into the water over the entire pond area, for example to count the fish. If the decorative green plates 1 were used, fish could lie under the plates at the sides of the pond and so fail to be counted. As acrylic has a slightly greater specific gravity than water, guard plates 1 made of transparent acrylic are provided with flotation units (described below with reference to FIG. 5) which ensure that the plates float. The transparent acrylic plates also have the advantage of not providing hiding places for rats, mice, voles or frogs which might enter the pond and cause pollution.

In either case, the plates 1 are such that a fish landing on the floating guard will be able to escape, either because it is sufficiently heavy partially to submerge the plate concerned, or by flapping around using its fins.

Figure 2:
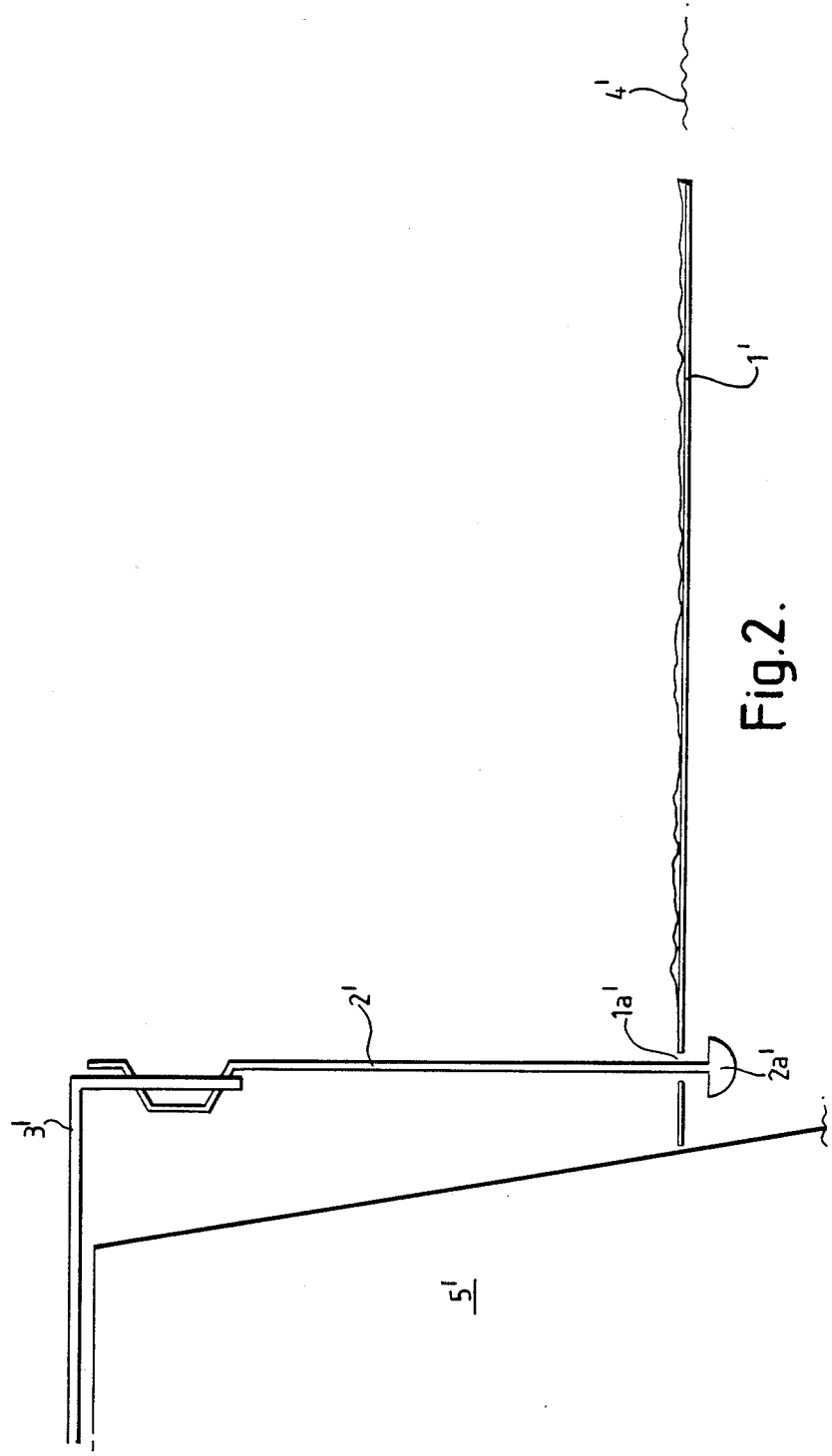
FIG. 2 is a schematic side elevation of one unit of the second form of fish protection system.

FIG. 2 shows one unit of a second form of fish protection system, which is a modification of the first system. Here, each guard plate 1' is supported by a support arm 2', which is made of polypropylene, and a stainless steel rod 3'. The rod 3' is fixed to the wall 5' of the pond, and the support arm 2' is fixed to the rod. The support arm 2' is a sliding fit within an aperture 1a formed in the guard plate 1', and carries a stop member 2a' which is larger than the aperture 1a'. The sliding fit between the support arm 2' and the aperture 1a' enables the guard plate 1' to adjust its floating position to any pond water level within a given range of water levels.

Figure 3:
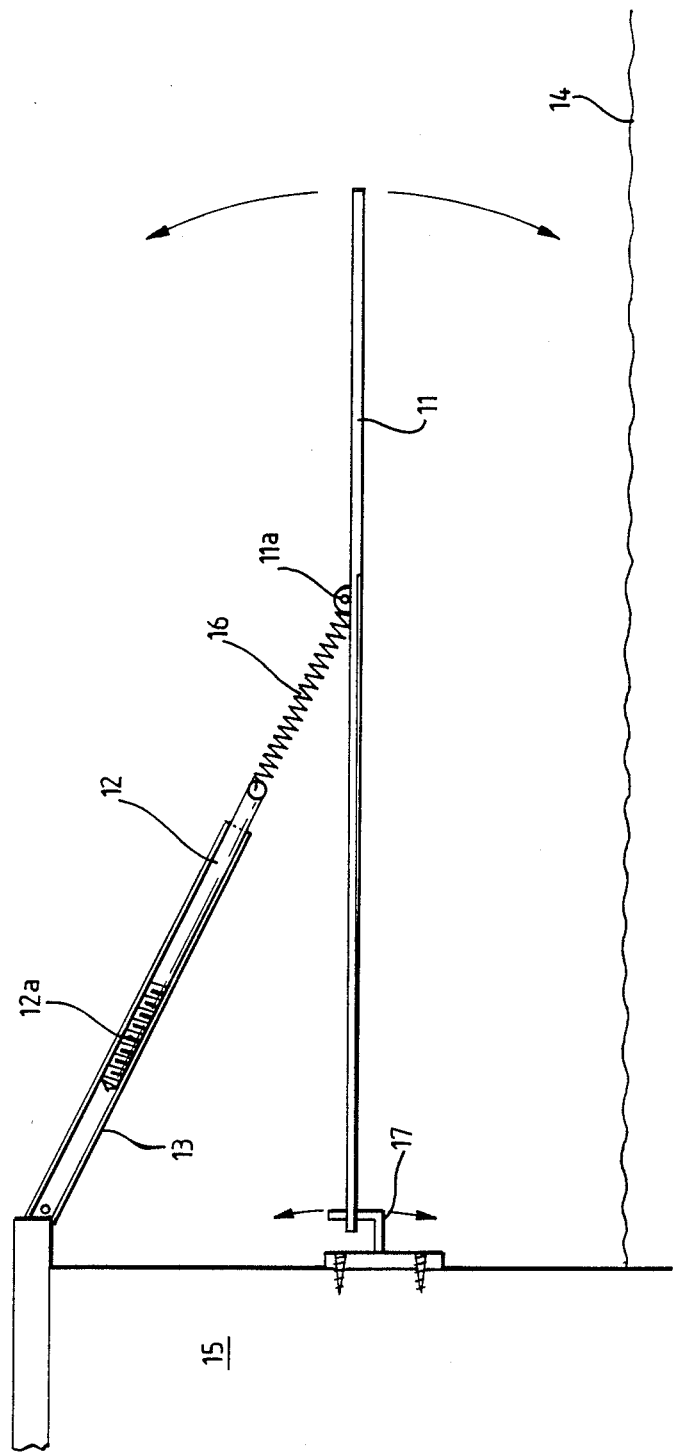
FIG. 3 is a schematic side elevation of one unit of the third form of fish protection system.

FIG. 3 shows one unit of a third form of fish protection system, the unit comprising a guard plate 11 (identical to the plate 1 of the unit of FIG. 1), a support arm 12 having an externally-threaded portion 12a, and a hollow, internally-threaded barrel adjuster 13. The adjuster 13 is pivotally fixed to a wall 15 of a pond, and the free end of the support arm 12 is connected to a fixing point 11a on the plate 11 by means of a lightly-rated coiled tension spring 16. The edge portion of the plate 11 adjacent to the wall 15 is formed with fixing points (apertures) 17 (see FIG. 4), by means of which the plate is pivotally supported by means of support lugs 18 fixed to the wall. The arrangement is such that the plate 11 is positioned generally horizontally above the surface 14 of the water in the pond.

As with the systems of FIGS. 1 and 2, the third form of system is constituted by a plurality of units of this type, the units being placed side-by-side along the side walls 15 of the pond. Here again, therefore, this type of system is best suited to a rectangular pond. Also, as with the embodiments of FIGS. 1 and 2, the plates 11 can be made of green polypropylene to give a decorative appearance, or they can be made of transparent acrylic for use by fish farmers.

Figure 6:
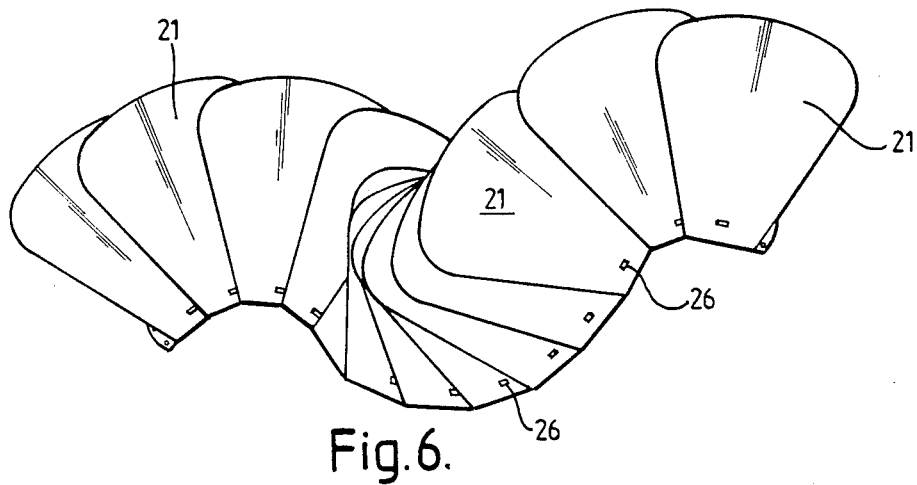
FIG. 6 is a plan view of the fourth form of system which is constituted by a plurality of protection plates of the type shown in FIG. 5.

Because the guard plates 11 are supported by the springs 16, they do not constitute a firm support for a cat's paw, that is to say such a plate will give if a cat puts any weight on it.

Where a fish pond requiring protection does not have straight side walls, particularly where a pond has curved side walls, the fourth form of system (shown in FIGS. 5 and 6) is preferable. Here, the system is constituted by a plurality of guard plates 21, each being generally fan-shaped. The narrow end portion 22 of each plate 21 is provided with a pair of lugs 23 which can be snap-rivetted to the lugs of adjacent plates. In this way, a plurality of plates 21 can be pivotally connected together by their lugs 23, so that the edges 22a of the narrow edge portions 22 can be shaped to follow even fairly intricate curved walls (as illustrated in FIG. 6). If the pond has corners or curves having a very small radius of curvature, the system of FIGS. 5 and 6 needs special adaptor plates (such as the plate 24 shown in FIG. 7) to interconnect two series of plates 21, thereby preventing bunching of the plates 21 at corners or sharp bends. The plates 21 are preferably made of green polypropylene, so that they will float on the surface of the water in a pond. Alternatively, the plates 21 could be made of transparent acrylic. In this case, each plate 21 is provided with three flotation units 25, each of which is constituted by a sealed tube containing air. Obviously, the number of flotation units 25 required for a given plate 21, and their sizes and positions, depends upon the size and shape of the plate. For the plates 21 illustrated (which have a length of about 230 mm and a maximum width of about 125 mm) three flotation units 25, positioned as shown, are required.

Each plate 21 is also provided with a fixing point 26, by means of which the plate can be fixed to the side wall of a pond. In practice, not every plate 21 will need to be fixed, and only, say, every fifth plate will need fixing.

Figures 8, 10:
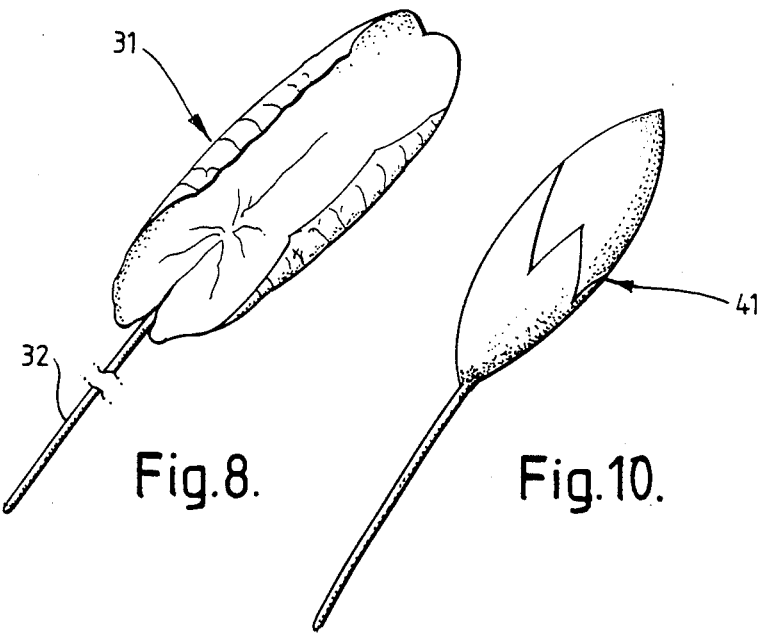
FIG. 8 is a schematic side elevation of an add-on decorative member for use with any of the four forms of system.
FIG. 10 is a plan view of a modified add-on member.
Figure 9:
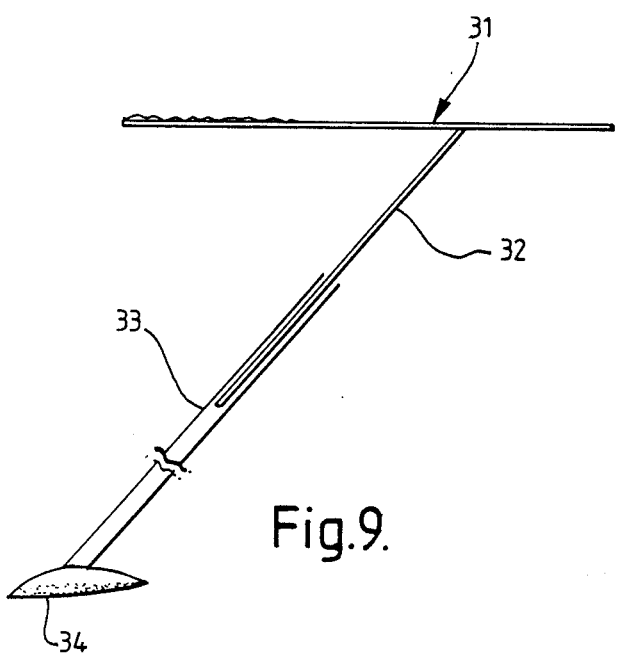
FIG. 9 is a plan view of the member shown in FIG. 8.

FIGS. 8 and 9 show an add-on decorative member 31 (a half-open lily pad leaf), which can be added to any of the four systems described above with reference to FIGS. 1 to 7. The members 31 can be made of green polypropylene or transparent acrylic to suit the system to which they are add-on members, thereby enhancing the 'natural look' of the system concerned. The member 31 is provided with a steel stalk 32 which is a telescopic friction fit within a plastics tube 33, to the lower end of which is fixed an encapsulated lead weight 34. In order to fix the member 31 in position, its stalk 32 is pushed through a hole drilled in a main plate (1, 1', 11 or 21), and the tube 33 is then slid over the stalk, so that the lead weight 34 holds the member 31 firmly down against the upper surface of the main plate.

FIG. 10 shows an alternative form of add-on member 41, this member being in the form of a lily bud. Here again, the member 41 could be made of green polypropylene or transparent acrylic.

Obviously, modifications could be made to the form of fish protection system described above. Thus, the plates 1, 1' and 11 could be moulded to depict decorative patterns other than lily leaves. For example, the plates 1, 1' and 11 could have a cobbled, rippled, brickwork, basketweave, netting or paved appearance. Alternatively, in view of the Japanese connection with exotic fish, the plates 1, 1' and 11 could be moulded to depict Japanese characters or symbols. Moreover, the add-on members could take the form of any sort of leaf or bloom of water lily. Also, the guard plates 1, 1', 11 and 21 could be made of other types of plastics material than polypropylene, for example expanded polystyrene or bubble insulation material. These plates could also be made of wood or cork. Where the plates are made of a material that does not float, they would, of course, be provided with flotation units when the plates are required to float.

The guard plates also constitute an ideal resting ledge for frogs. Normally, with steep-sided ponds, frogs can get in, but cannot get out. The ledge enables frogs to be noticed resting, when they can be removed.

I claim

1. A fish protection system comprising a plurality of guard plates, and support means for supporting the guard plates on the surround of a fish pond so as to position the guard plates around the perimeter of the pond at the water level, wherein the support means is such that any given guard plate will tilt downwardly if subjected to a downwards force of a predetermined magnitude.

2. A system according to claim 1, wherein the support means comprises a plurality of support devices, each of which is associated with a given guard plate.

3. A system according to claim 2, wherein each support device comprises a support member which is fixable to the surround of the pond, the support member being fixed to the associated guard plate in such a manner as to permit relative movement therebetween.

4. A system according to claim 3, wherein the support member of each support device is telescopically connected to a further support member which is fixed to the associated guard plate.

5. A system according to claim 3, wherein the support member of each support device is a slidable fit within an aperture in the associated guard plate, the support member being provided with a stop for limiting the relative movement between the support member and the guard plate.

6. A system according to claim 4 or claim 5, wherein the guard plates are designed so as to float on the surface of the water in the pond, the relative movement between the guard plates and the support members permitting the guard plates to float for a varying range of water levels in the pond.

7. A system according to claim 1, wherein the guard plates are generally fan-shaped, and each is provided with connection lugs on opposite sides of the narrow end portion thereof.

8. A system according to claim 7, wherein the connection lugs connect the guard plates pivotally together, so that a plurality of interconnected guard plates can be positioned in close proximity to the side of a pond even when that side curves.

9. A system according to claim 6, wherein the guard plates are made of a non-toxic, ultra-violet stabilised plastics material, such as polypropylene, which has a specific gravity substantially equal to 1.0.

10. A system according to claim 9, wherein each guard plate is moulded from green polypropylene so as to take the form of a group of lily pad leaves.

11. A system according to claim 6, wherein the guard plates are made of transparent acrylic, and are provided with flotation means.

12. A fish protection system comprising a plurality of guard plates, and support means for supporting the guard plates on the surround of a fish pond so as to position the guard plates around the perimeter of the pond slightly above the water level, wherein the support means is such that any given guard plate will tilt downwardly if subjected to a downwards force of a predetermined magnitude.

13. A system according to claim 12, wherein each support device comprises a support arm which is fixable to the surround of the pond, a tension spring connecting the support arm to the associated guard plate, and pivot connection means for pivotally supporting an edge portion of that guard plate on a side wall of the pond.

14. A system according to claim 12 or claim 13, wherein the guard plates are made of a non-toxic, ultra-violet stabilised plastics material, such as polypropylene.

15. A system according to claim 14, wherein each guard plate is moulded from green polypropylene so as to take the form of a group of lily pad leaves.

* * * * *